Dec. 18, 1951  G. D. ANGLE  2,578,875
VALVE ACTUATING MECHANISM FOR MULTIPLE-ROW RADIAL ENGINES
Filed June 13, 1947  3 Sheets-Sheet 3
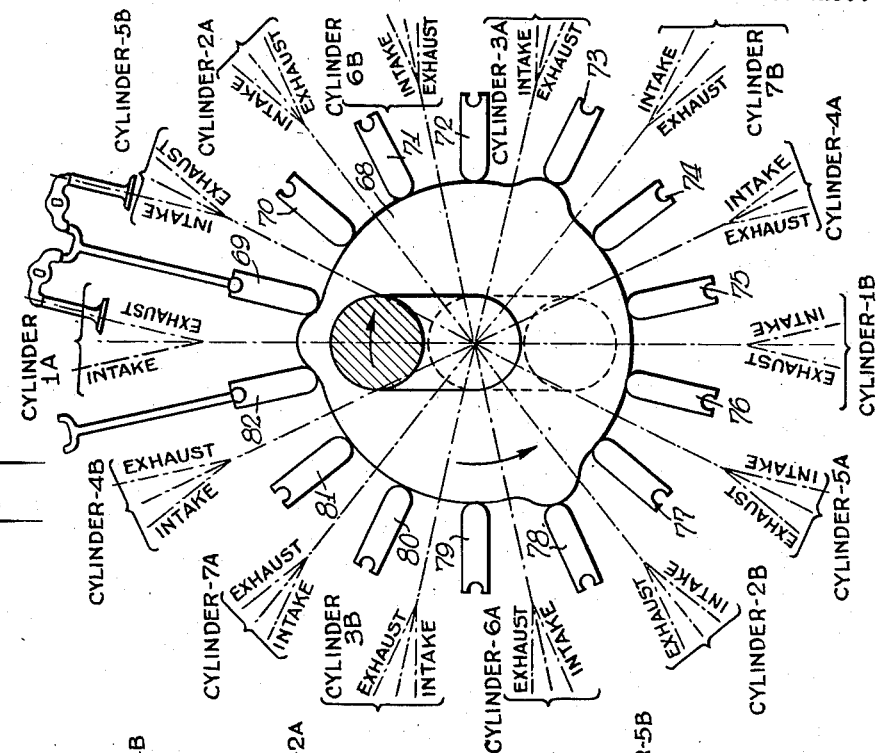
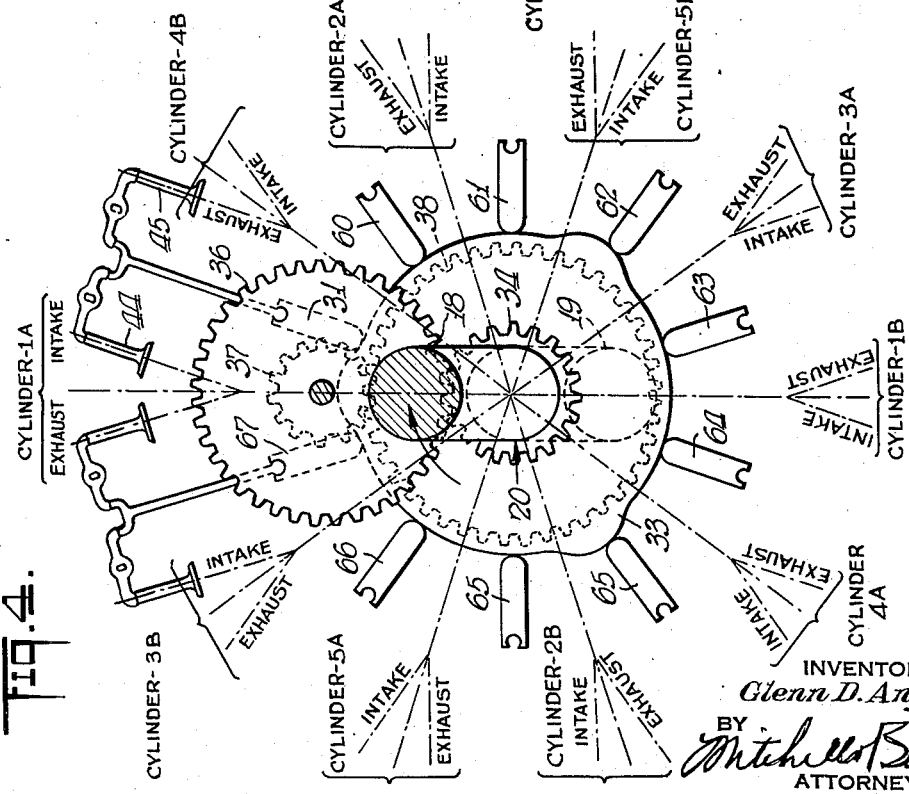
INVENTOR
*Glenn D. Angle*
BY
ATTORNEYS Patented Dec. 18, 1951

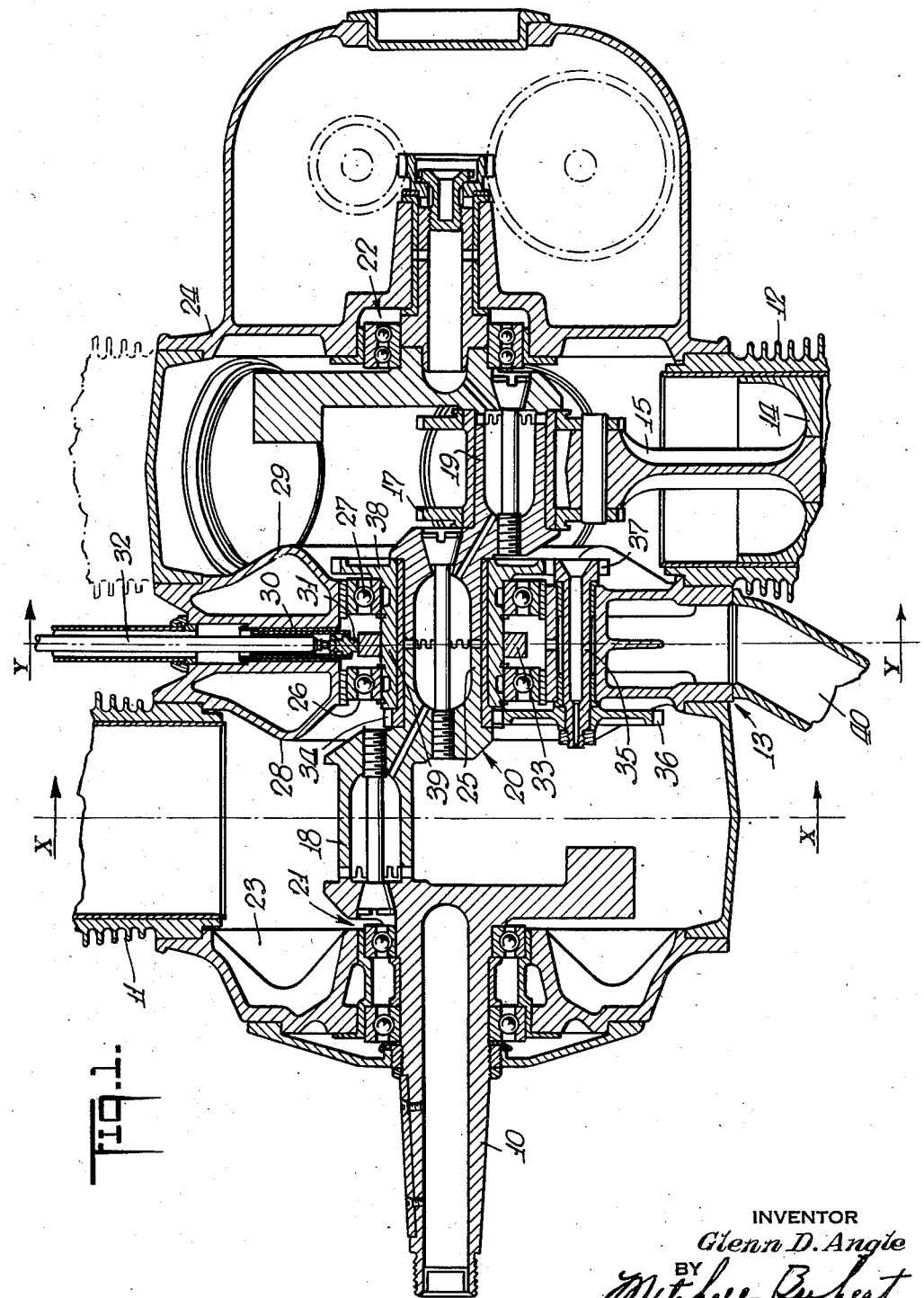

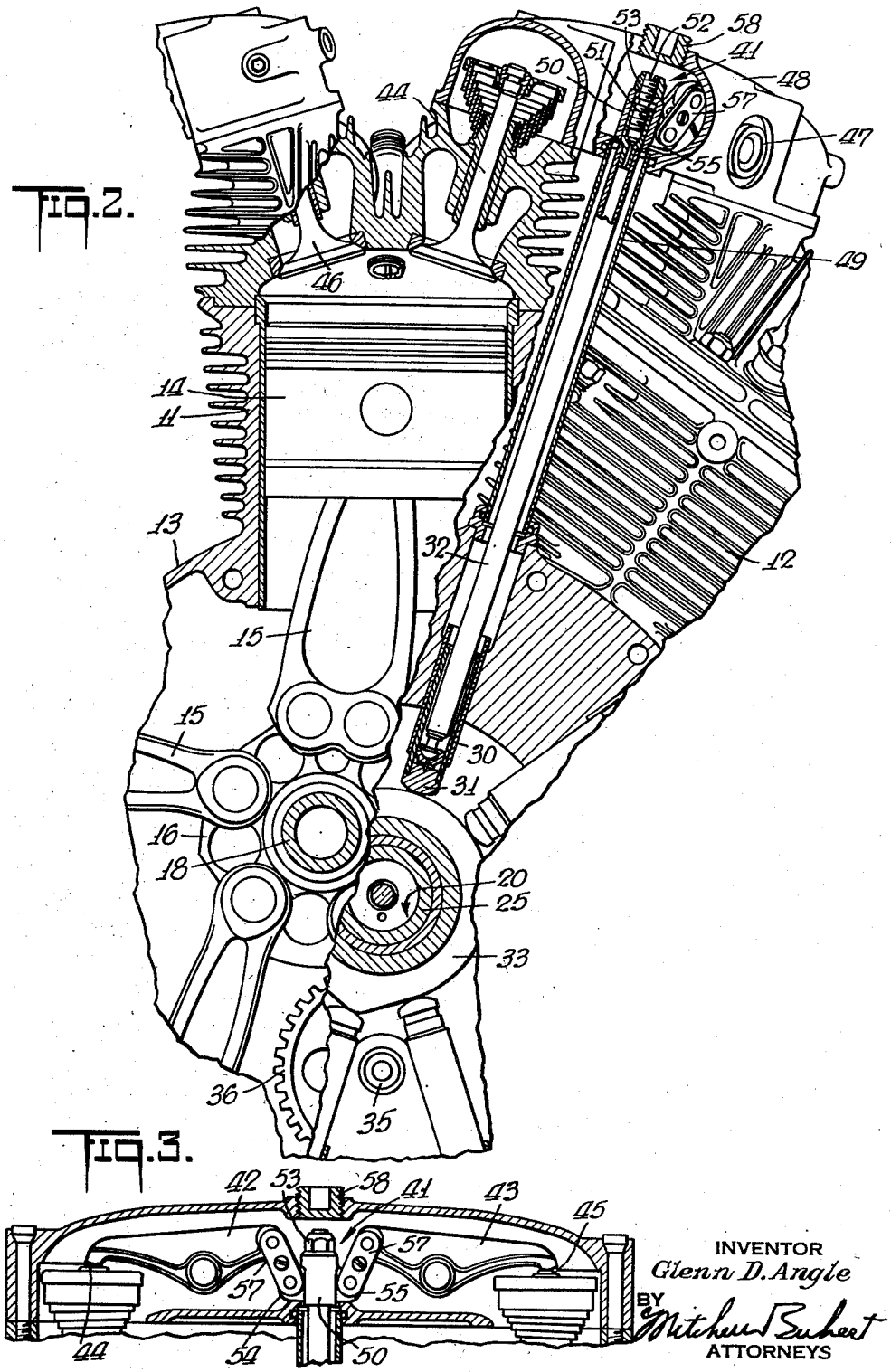

2,578,875

UNITED STATES PATENT OFFICE 2,578,875

VALVE ACTUATING MECHANISM FOR MULTIPLE-ROW RADIAL ENGINES

Glenn D. Angle, Thomaston, Conn., assignor to The New Britain Machine Company, New Britain, Conn., a corporation of Connecticut Application June 13, 1947, Serial No. 754,557

4 Claims. (Cl. 123—55)

My invention relates to valve-actuating mechanisms for internal-combustion engines, and in particular to a valve-actuating mechanism for a multiple-row radial engine.

It has been a customary practice in multiple-row radial engines, such as ten, fourteen, and eighteen-cylinder engines (double conversions of five, seven, and nine cylinders, respectively) to place the cam rings either at the front or at the rear, or at both ends of the engine. This arrangement invariably results in a multiplicity of parts in the valve mechanism, and these parts are, for the most part, not interchangeable. It is current commercial practice to employ at least two and sometimes four valve-timing cam rings, each ring having the necessary number of lobes to satisfy the number of cylinders served and the velocity of cam rotation.

It is an object of my invention to provide an improved valve-actuating mechanism for a machine of the character indicated.

It is another object to provide means whereby the design, construction, assembly, and maintenance of multiple-row radial engines may be simplified over current practice.

It is also an object to provide means for increasing interchangeability of parts in a multiple-row, radial engine.

It is a more specific object to simplify the construction of a multiple-row radial engine by reducing the required number of valve-timing cam rings.

It is a still more specific object to provide an improved valve-actuating mechanism for a twin-row radial engine, whereby all valves of both rows of cylinders may be operated from a single cam ring.

Other objects and various further features of the invention will be pointed out or will occur to those skilled in the art from a reading of the following specification in conjunction with the accompanying drawings.

In said drawings:

Fig. 1 is a vertical sectional view through the central axis of a twin-row, ten-cylinder, radial engine incorporating features of the invention;

Fig. 2 is a fragmentary view of the engine of Fig. 1, taken partially in section in substantially the plane X—X of Fig. 1, and partially in section in substantially the plane Y—Y of Fig. 1;

Fig. 3 is a partially sectionalized fragmentary view of rocker-arm parts of the engine of Fig. 1;

Fig. 4 is a view schematically illustrating the valve-timing functioning of the engine of Fig. 1; and Fig. 5 similarly schematically illustrates valve-timing functions for a twin-row, fourteen-cylinder, radial engine incorporating features of the invention.

Broadly speaking, a principal feature of my invention contemplates utilization of a single cam ring to actuate all the valves of the cylinders in two adjacent rows of a multiple-row radial engine. In the specific forms to be described, twin-row engines are considered, and the cam ring is located between the rows. Valve actuation is by means of generally radially extending cam-follower push-rods and by a novel system of rocker arms or tappets.

In order clearly to understand how all valves of a multiple-row radial engine may be operated from a single cam ring, it is best perhaps to explain first how a single-row radial engine may be operated from a single cam ring.

The fundamental theory on the use of a single cam ring, which means that the same lobes on the cam must operate both inlet and exhaust valves, is that if it be acceptable to employ the same or nearly the same opening period for both types of valves, advantage may be taken of the speed of rotation of the cam ring by placing the cam followers radially about the central engine axis, to subtend an angle equal to the valve-opening period divided by the speed of rotation. In other words, if for a five-cylinder machine we choose to have a valve-opening period of 240 degrees of crankshaft travel, and if we employ a cam ring running in the same direction as the crankshaft and traveling at one-sixth crankshaft speed, the followers may be placed 40 degrees, or one-sixth of 240 degrees of crankshaft rotation, apart. It will be seen then that if these followers are placed twenty degrees on each side of the axis for each cylinder, there will be an exhaust valve closing at or about the same time that the inlet valve of the same cylinder is opening, which is in accordance with valve-timing practices with regard to internal-combustion engines.

It should be noted that the above valve-opening periods are merely chosen for illustration and that any included angle which will give a satisfactory valve-opening period may be used. In the description to follow it will be found that the angle between the cam-follower axes has been chosen as 36 degrees (for the case of a ten-cylinder engine). The arrangement to be described is then such as to produce valve-opening periods of substantially 216 degrees of crankshaft rotation, if only one valve is to function at a time in any one cylinder; alternatively, greater opening periods may be obtained if a small amount of valve-overlap may be tolerated.

It will be appreciated that the chosen angle of 36 degrees between cam-follower axes is equal to one-half the angle between the equally spaced cylinders of a five-cylinder radial engine, namely, 72 degrees. If another row of five cylinders is placed directly back of the first row in the staggered relation customary in twin-row engines, that is, with the cylinders of the second row radially midway between the cylinders of the first row, the angle between a cylinder of the first row and the adjacent cylinder (to the rear) in the second row will be 36 degrees. This means then that by locating the cam-follower axes 18 degrees on both sides of the cylinder axes of the first row, they must also be 18 degrees on both sides of the cylinder axes of the second row, viewed in a radial direction about the crankshaft axis.

It is an important feature of the invention that a cam-follower may be made to serve valves of the second row as well as of the first row, by locating the cam midway between the two rows of cylinders and by thus making the other parts comprising the valve-actuating mechanism interchangeable.

Referring to Figs. 1, 2, and 3 of the drawings, my invention is shown in application to a twin-row, ten-cylinder radial engine. The separate rows will be referred to as the front row and the back row, the front row being the nearer to the propeller drive shaft 10. The front row comprises a bank of five equally spaced cylinders 11, and the back row a similar set of five equally spaced cylinders 12. Preferably, the cylinder axes for the back row are symmetrically staggered with respect to the cylinder axes for the front row. All cylinders for both rows may be conventionally attached to or formed with a crankcase 13.

Motive power is derived from twin sets of pistons 14 and connecting rods 15, coupled by means of so-called big-end clusters 16—17 to oppositely phased offsets 18—19 of a common crankshaft 20. In the form shown, there is direct drive from the crankshaft 20 to the propeller-hub spindle 10. The crankshaft may be journaled at both ends in anti-friction bearing mountings 21—22 supported, respectively, in front and back end plates 23—24 forming parts of the crankcase 13. The middle section 25 of the crankshaft 20 may be unsupported, but in the form shown it is journaled in anti-friction bearings 26—27 positioned by internal structural members 28—29 forming part of the crankcase 13. The parts that have thus far been identified are well known and form no part of my invention.

In accordance with a principal feature of the invention, the valve-actuating means for the valves of the cylinders of both the front and the back row is located between these rows. In the form shown, this actuating means comprises a plurality of generally radially extending cam-follower guides 30, and the cam-followers 31 and push-rods 32 associated therewith. The cam-followers 31 may be actuated by a single cam ring 33 which may be driven by suitable gearing means at a reduced speed with respect to the crankshaft. The reduction gearing may comprise an annular pinion 34 suitably locked to the central section 25 of the crankshaft, an idler shaft 35 carrying a gear 36 to mesh with the pinion 34 and driving a pinion 37, and the pinion 37 driving a fourth gear 38, which by means of an integral sleeve 39 may carry and drive the cam ring 33. Since in the form shown the central section 25 of the crankshaft 20 is journaled to parts 28—29 of the crankcase, these parts 28—29 may be formed to define an annularly extending manifold which may serve, via an inlet 40 and suitable outlets (not shown) to respective cylinders 11—12, to supply inlet uncombusted mixtures to the cylinders. It will be clear that supports for the valve-actuator guides 30 may be suitably formed so as to pass through this manifold without disturbing the independent functioning of the manifold system or of the valve-actuating system.

In accordance with another principal feature of the invention, each push-rod 32 may be employed to actuate a valve of a cylinder 11 of one row as well as a valve of a cylinder 12 of another row, and this actuation is preferably simultaneous. In the form shown (see Figs. 2 and 3), push-rod 32 imparts valve-actuating motion via suitable adapter means 41 to two tappets or rocker arms 42—43. The rocker arm 42 may actuate a valve 44 of a cylinder 11 in the front row, and the rocker arm 43 may actuate a valve 45 of the nearest adjacent cylinder 12 in the back row of cylinders. As explained in the introduction above, the reduction gearing for the cam drive may provide a 6-to-1 reduction from the speed of crankshaft rotation, and the cam rotation may be in the same direction as that of the crankshaft. Assuming then that the crankshaft and the cam 33 operate clockwise (in the sense of Fig. 2), the valve 44 will be an inlet valve for cylinder 11 and the valve 45 will be an exhaust valve for the cylinder 12. The exhaust valve 46 for the cylinder 11 will be understood to be operated by another valve-actuating mechanism similar to that which has been described for the valve 44, the difference being that the cam-follower and push-rod for the exhaust valve 46 will be located substantially 36 degrees counterclockwise (in the sense of Fig. 2) with respect to the axis of the push-rod 32. It will further be understood that, simultaneously with actuation of the exhaust valve 46, the inlet valve of the next counterclockwise adjacent cylinder in the back row will also be actuated.

In providing suitable pivotal anchorage of the rocker arms 42—43 to the frame of the machine, these rocker arms 42—43 may be journaled as at 47 to the wall of a rocker-arm housing 48 bridging the upper ends of the valves 44 and 45 as well as the casing 49 for the push-rod 32. In the form shown, the adapter means for imparting push-rod motion to the rocker arms 42—43 includes a thimble member 50 slidably receivable over the end of the push-rod 32. For adjustment purposes a system of screws 51—52 and a lock nut 53 may cooperate to provide longitudinal adjustment of the thimble 50 upon the end of the push-rod 32. The thimble 50 may be provided with a pair of integral lugs 54—55 to carry connecting members 56—57, freely linking the adapter 50 to the inner ends of the rocker arms 42—43. It will be clear that adjustment of tappet clearances for both valves 44 and 45 is readily possible through the adjustable securing of the lock nut 53 upon the screw means 51—52. If desired, ready access to these parts may be had through a removable cover member or plate 58 forming part of the housing 48.

To illustrate more fully how the above-described ten-cylinder engine may be operated, reference is made to the generally schematic diagram of Fig.

4, which shows the relative angular dispositions of cam-followers and valve axes. The reduction gearing 34—36—37—38 for the three-lobed cam 33 will be recognized. Cylinders of the front row are numbered from 1A to 5A, while those in the back row are designated 1B to 5B. It will be clear that the cam-follower 31 will simultaneously actuate the intake valve 44 of cylinder 1A and the exhaust valve 45 of cylinder 4B, that cam-follower 60 will simultaneously actuate the intake valve of cylinder 4B and the exhaust valve of cylinder 2A, that the cam-follower 61 will simultaneously actuate the intake valve of cylinder 2A and the exhaust valve of cylinder 5B, that the cam-follower 62 will simultaneously actuate the intake valve of cylinder 5B and the exhaust valve of cylinder 3A, and so on, with each of the successive cam-followers 63 through 67 operating an intake valve of one cylinder and an exhaust valve of the next adjacent cylinder.

In the form shown, that is, with a three-lobed cam revolving at one-sixth the crankshaft speed, in the same direction as the crankshaft, the normal timing of cylinders will be 1A—2B—3A—4B—5A—1B—2A—3B—4A—5B. Also, if cam lobes exactly span the arc between adjacent cam-followers, there will be no valve-overlap, and each valve will be operated for about 216 degrees of crankshaft rotation. As indicated above, a relaxation of tolerances to permit slight valve-overlap, that is to say, employment of 40-degrees-wide cam lobes (as distinguished from the 36-degrees-wide lobes shown), would result in extension of the valve-opening periods for all valves to about 240 degrees of crankshaft rotation. Such overlap may be desirable in certain applications.

In Fig. 5 I illustrate, again schematically, how the above-described principles of my invention may be applied to a fourteen-cylinder, twin-row engine. For clarity, cam-timing gears have been omitted, but for the illustrated case the single cam 68 will be understood to have three lobes and to be driven at one-sixth the speed of the crankshaft, in a directing opposing crankshaft rotation. The single cam 68 is again placed between rows of cylinders, the front bank of which is designated 1A through 7A, and the back row of which is indicated as 1B through 7B. In the form shown, the cylinders of the front row are symmetrically staggered between cylinders of the back row, and fourteen cam-followers 69 through 82 and their associated push-rods are distributed between adjacent cylinders.

As in the case of the ten-cylinder engine, each push-rod of the fourteen-cylinder arrangement may simultaneously actuate two valves—the exhaust valve of a cylinder of one row and the intake valve of a cylinder of the other row. Thus, the cam-follower 69 simultaneously actuates the exhaust valve of cylinder 1A and the intake valve of cylinder 5B, the cam-follower 70 simultaneously actuates the exhaust valve of cylinder 5B and the intake valve of cylinder 2A, and so on through to the cam-follower 82, which actuates both the exhaust valve of cylinder 4B and the intake valve of cylinder 1A.

For the assumed case of the three-lobed cam 68 rotating opposite (counterclockwise in the sense of Fig. 5) to the crankshaft and at a 1:6 reduction, the normal firing order will be 1A—2B—3A—4B—5A—6B—7A—1B—2A—3B—4A—5B—6A—7B. If the cam lobes exactly span the arc (25 5/7 degrees) between adjacent cam-followers, there will be no valve-overlap, and each valve will be operated about 154 2/7 degrees (i. e. 6×25 5/7) of crankshaft rotation. This relatively small valve-opening period may, as indicated for the ten-cylinder case, be modified to meet particular requirements for the engine—as by permitting valve-overlap. For example, with a valve-overlap of 51 3/7 degrees, the total opening for each valve may be extended to 205 5/7 degrees (both figures representing extent of crankshaft rotation).

It will be understood that I have disclosed how valve-actuation in a twin-row engine may be simplified by reducing the necessary number of parts and by requiring no duplication of parts having one and the same function. Conventionally, in twin-row radial engines there are either two or four cam rings, possibly different cam-followers, and certainly different push-rods and enclosing tubes, and perhaps special rocker boxes and rocker arms. With this invention, on the other hand, it will be seen that the rocker arms may be interchangeable, and instead of two cam-followers and two push-rods, there need only be one cam-follower and one push-rod performing the same work. Besides assuring interchangeability of the parts of the entire valve mechanism, the novel arrangement permits employment of interchangeable cylinders and other parts which may be affected by the valve-mechanism design. The new arrangement provides complete symmetry about the plane midway between the two rows of cylinders and provides space for isolating the valve mechanism and for thereby increasing the space (at either end of the engine) which may be needed for mounting and driving other auxiliary units.

In the broader sense, then, as viewed from the structural and maintenance point of view, the valve-mechanism arrangement which has been described offers substantial advantages as compared with usual practice.

Although I have described my invention in detail for the preferred forms shown, it will be understood that modifications may be made within the scope of the invention as defined by the claims which follow.

I claim:

1. In a multi-cylinder radial engine having two rows of cylinders, valve-timing cam means between said rows, a cam follower, a push rod abutting said cam follower, rocker-arm means operatively associating said push rod with a valve in one of said rows, and rocker-arm means operatively associating said push rod with a valve in the other of said rows.

2. In a multiple-cylinder radial engine, two rows of angularly spaced cylinders, a generally radially extending push rod between a cylinder of one row and a cylinder of the other row, the inclination of said push rod substantially bisecting the angle between the axes of said adjacent cylinders, inlet and exhaust valves in said cylinders, said push rod having a valve-actuating end that is substantially the same radial distance from the axis of said engine as are the actuated ends of the valves, and rocker arm means connecting said push rod to the inlet valve in one of said adjacent cylinders and to the exhaust valve in the other of said adjacent cylinders.

3. In an engine, two rows of radially directed cylinders, a push rod between a cylinder in one row and a cylinder in the other row, a rocker-arm assembly for actuating valves of both said rows, said assembly including housing means to be secured to a stationary part of the engine, adapter means for abutment with said push rod, two rocker arms journalled in said housing means and generally oppositely disposed about said adapter means, one of said rocker arms including a valve-actuating part for said cylinder in said one row, the other of said rocker arms including a valve-actuating part for said cylinder in said other row, said parts and the journal axes of said arms and said adapter means being generally in a common plane that is generally normal to the actuating axis of said push rod, and means pivotally linking said adapter means to the ends of said arms nearest said adapter means.

4. In an engine, two rows of radially directed cylinders, a push rod between a cylinder of one row and a cylinder of the other row, a rocker-arm assembly for actuating valves of both said rows, said assembly including push-rod-engaging means for said rod, two rocker arms generally oppositely disposed about said push-rod-engaging means and including ends to engage valves of both said rows, said ends and said push-rod-engaging means and the pivot axes of said arms being generally in a common plane, and adapter means on said push-rod-engaging means for pivotally linking both said rocker arms to said push-rod-engaging means, said adapter means including longitudinally adjustable means for adjustably locating the points of such pivotal linkage axially with respect to said push-rod-engaging means.

GLENN D. ANGLE.

REFERENCES CITED

The following references are of record in the file of this patent:

UNITED STATES PATENTS

| Number | Name | Date |
|---|---|---|
| 814,421 | Austin | Mar. 6, 1906 |
| 1,100,347 | Bourcier | June 16, 1914 |
| 1,623,041 | Barbarou | Apr. 15, 1927 |
| 1,781,434 | Brownback | Nov. 11, 1930 |
| 1,817,645 | Poyer | Apr. 4, 1931 |
| 1,897,191 | Farina | Feb. 14, 1933 |
| 2,425,156 | Knight | Aug. 5, 1947 |
| 2,426,877 | Willgoos et al. | Sept. 2, 1947 |

FOREIGN PATENTS

| Number | Country | Date |
|---|---|---|
| 120,285 | Great Britain | Nov. 7, 1918 |
| 139,406 | Great Britain | Mar. 4, 1920 |